A. P. MEYLERT.
APPARATUS FOR DRYING FERTILIZERS AND OTHER ARTICLES.
No. 195,034. Patented Sept. 11, 1877.
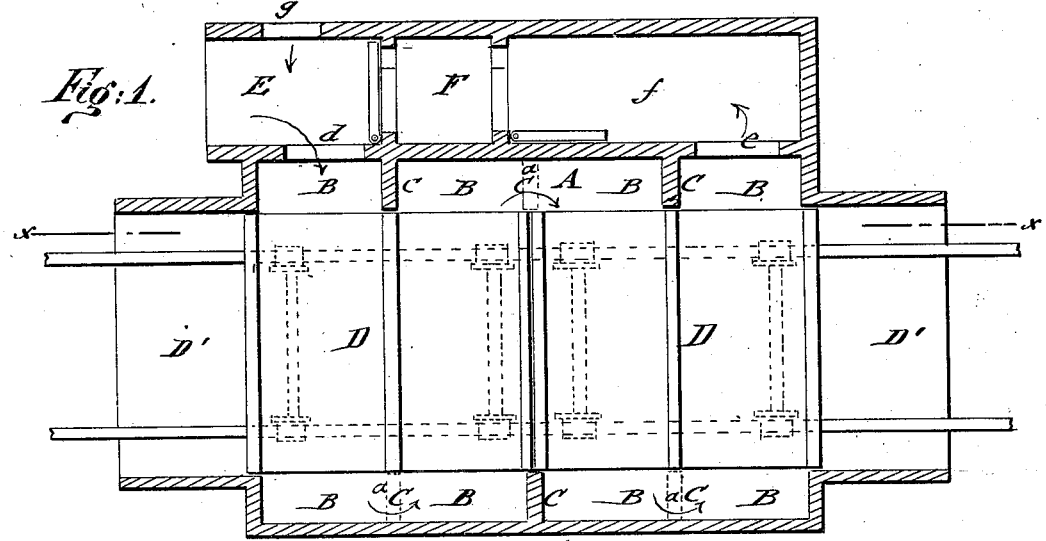
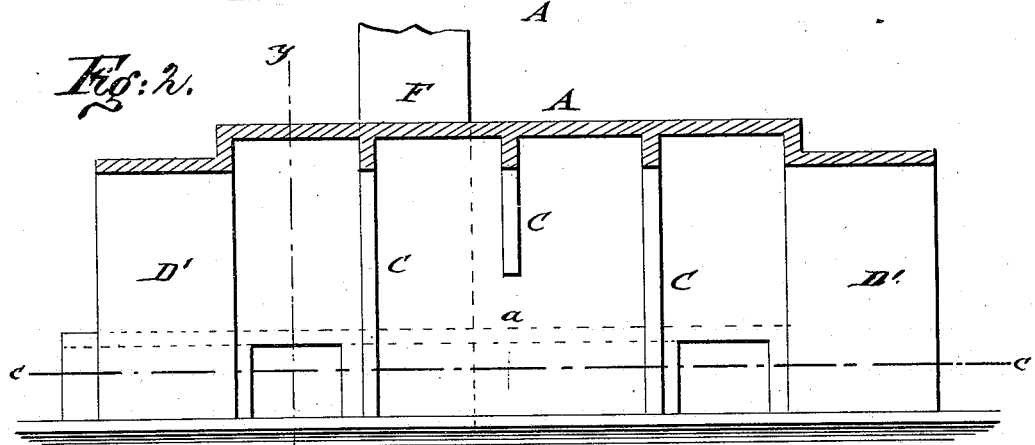
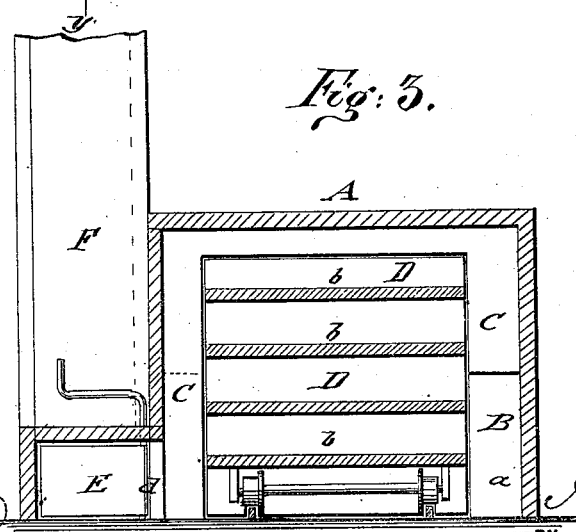
WITNESSES:
INVENTOR:
A. P. Meylert
BY
ATTORNEYS.

UNITED STATES PATENT OFFICE.

ASA P. MEYLERT, OF BROOKLYN, NEW YORK.

IMPROVEMENT IN APPARATUS FOR DRYING FERTILIZERS AND OTHER ARTICLES.

Specification forming part of Letters Patent No. 195,034, dated September 11, 1877; application filed May 21, 1877.

*To all whom it may concern:*

Be it known that I, ASA P. MEYLERT, of Brooklyn, county of Kings, and State of New York, have invented a new and Improved Drying Apparatus, of which the following is a specification:

The object of this invention is to furnish an improved apparatus for drying fertilizers and other commodities in an economical manner.

The invention will first be described in connection with the drawing, and then pointed out in the claims.

In treating fertilizers and other similar substances there is usually no occasion to keep the heated air used in drying so pure as to require a careful separation of it from the ordinary gases produced in combustion. The immense quantity of air which must necessarily be used in drying a great mass of material, and the expense of heating so large a volume in air-heating furnaces, have led me to devise a method of heating atmospheric air by bringing it directly within a furnace-chamber, or the flue of a furnace, and allowing it to mingle there in any suitable proportions with the gaseous products of combustion, and then causing it to pass, mixed with these gases, within a drying apparatus and in contact with the substance to be dried therein.

By this method a furnace of ordinary construction may be applied to heating atmospheric air without the expense of providing special air-heating surfaces, or covers, or partitions to separate the gaseous products of combustion from the heated air, or the furnace used for heating a steam-boiler or for any other employment may be utilized in like manner for the purpose of simultaneously heating atmospheric air.

The apparatus consists of a large drying-chamber, having a series of sectional spaces at both sides, which are divided by partition-walls, having communicating openings at alternately opposite sides of the main chamber. A series of cars are made to pass on a tramway through the drying-chamber. These are constructed with inclosed vertical partitions and closed ends, having horizontal platforms or trays intervening between the partitions, which platforms communicate with the sectional side spaces, and the linear space between the vertical inclosed partitions occupied by the series of platforms is similar to the length of a side section in the drying-chamber. The platforms or trays within the cars are placed in successive series, one platform being put above another in a series, with an intervening space between each two platforms in a series. Each of these platform spaces is open on both sides, to let the heated air pass through below and above the material to be dried, thus providing a free transit for the air from one side section of the apparatus to another opposite.

At either end of the drying-chamber is a passage-way, the length of which is similar to the length of a section of the drying-chamber, or equal at least to the length of the space between successive vertical positions of a single car. Its height and width are merely sufficient to admit the car, and as the ends and vertical partitions of the car are inclosed, a car in moving through the passage-way keeps the apparatus always closed.

Atmospheric air of any suitable temperature is introduced through an opening near one end of the drying apparatus, within the drying-chamber, and, passing through the spaces amid the platforms or trays moving successively from one side to the other side of the apparatus, through a successive series of the platforms of cars standing in successive sections of the apparatus, it is at length removed, laden with the vapor arising from the fertilizer or other subject acted upon, at an opening near the opposite end of the apparatus.

In the accompanying drawings, Figure 1 represents a horizontal section of my improved drying apparatus on line *c c*, Fig. 2; Fig. 2, a vertical longitudinal section on line *x x*, Fig. 1; and Fig. 3, a vertical transverse section of the same on line *y y*, Fig. 2.

Similar letters of reference indicate corresponding parts.

A represents a large drying-chamber, which is arranged at the sides with and includes a series of adjacent rooms or sectional spaces B B, the latter being separated from each other by partition-walls C C. These walls C C are provided with openings $a$ $a$, which are located in alternate walls, and also at alternate sides of the apparatus. The sectional side spaces open into the large open space of the drying-chamber A, and they communicate freely each with the one opposite through the cars D D, which pass through the large open space of the chamber A on a tramway running through the entire apparatus.

The cars D D are usually constructed with two or more series of platforms or trays, $b$ $b$ $b$, upon which the material is placed to be dried. The ends of the car D, and also the partitions between two adjacent series of platforms, are inclosed in order to secure an automatic and continuous closure of the openings into the drying-chamber, and also to divert the air passing through the apparatus, as herein described.

At each end of the apparatus is a passage-way or chamber, D', through which the cars D D pass in moving into or out from said drying apparatus. The length or depth of each of these passage-ways is not less than that of a series of the platforms upon the car D, and its other dimensions are such as to correspond with those of a car which it closely surrounds and encompasses when within it.

Each sectional space B of the drying-chamber corresponds in length with one, two, or more car-partition spaces, or series of platforms in the car D.

As the cars are moved into and from the apparatus the closed end and partitions of the cars, being in the passage-ways, keep the external openings into the drying-chamber automatically closed, and when the cars are at rest and in place within the apparatus, their closed ends and partitions, being on the lines of the walls $c$ $c$, complete the separation of adjacent sections of the apparatus.

The heated gases derived from a steam-boiler furnace or other furnace, passing through a flue or chamber, E, are mingled with common air, which may be admitted to the chamber with the gases, or through any suitable opening, $g$, (shown in Fig. 1,) and the atmospheric and carbonic gases mixed together are permitted to pass into the drying apparatus through an opening, $d$, near one end of the same.

The relative quantity of atmospheric air which is intermingled with the gases of combustion will depend upon their respective temperatures, and also upon the specific purpose required. The quantity admitted may be so regulated as to provide any suitable temperature adapted to drying any substance for which an air-drying apparatus can be employed.

The heated air entering the apparatus at the opening $d$ passes transversely across the car, between and amid the platforms of the same, to the opposite side in section B; thence through the opening $a$ of the partition-wall to the adjacent side section B; thence transversely amid the platforms of the adjacent series or the platforms of the adjoining car to the section B on the opposite side; thence through the opening $a$ of this section to the adjoining side section B, and then back between the adjacent platforms of the car, and thus in the same manner the heated air passes amid as many platforms or through as many sections as may be deemed necessary or desirable to erect. The spent air, gases, and vapors are finally removed through a suitable opening, $e$, at or near the other end of the drying-chamber, and through a flue, $f$, to a chimney or stack, F. An exhaust-fan may be used in place of or in connection with the chimney F, or any other suitable method may be used for moving air through the apparatus.

The fertilizers or other substances stored and spread upon platforms or trays placed in the cars are dried as completely as desired by the passage of the heated air, being exposed to its influence at the will of the operator, and as one car passes into the drying-room at one end of the apparatus another car with dried material leaves the same at the other end, and thus there may be at the same time a continuous and economical drying of substances in quantity large or small, as may be desired.

Although I have described and figured a car consisting of a series of platforms or trays between vertical inclosed partitions, yet I do not confine my invention to a series of platforms, but may use a car with a single platform, and may use any style of car which shall be adapted, substantially as set forth, to the apparatus described herein.

Furthermore, I do not limit my process or method, as described herein, to any single form of apparatus; nor do I limit my apparatus, as described herein, to the employment of air in any combination, or heated by any specified method, or within any limitation of temperature, which may be adapted to the purpose named herein.

Having thus fully described my invention, I claim as new and desire to secure by Letters Patent—

1. A drying apparatus composed of sectional drying-chambers, having a central space and sectional side spaces which communicate at alternate sides, in combination with entrance and exit openings for air, and with a car or a series of cars which have closed ends and closed partitions, substantially as described.

2. The combination of a drying apparatus, having a passage-way or passage-ways, with cars having closed ends, and partitions of dimensions similar to those of the opening in said passage-ways, designed to keep the drying-chamber automatically closed in entering or leaving the same, substantially as described.

3. The sectional drying-chamber A, having sectional side spaces B B, divided by partition-walls with openings in alternate walls and at alternate sides, in combination with a series of cars, D D, having closed ends and closed partitions, and open platforms similar in length to the side spaces of the apparatus, intended to divert the air by a circuitous route through the side spaces and amid the platforms of the cars, substantially as described.

A. P. MEYLERT.

Witnesses:
PAUL GOEPEL,
C. SEDGWICK.